April 28, 1959 V. GINSBURG 2,884,021
APPARATUS FOR THE COLLECTION OF FRACTIONS
Filed Jan. 24, 1956
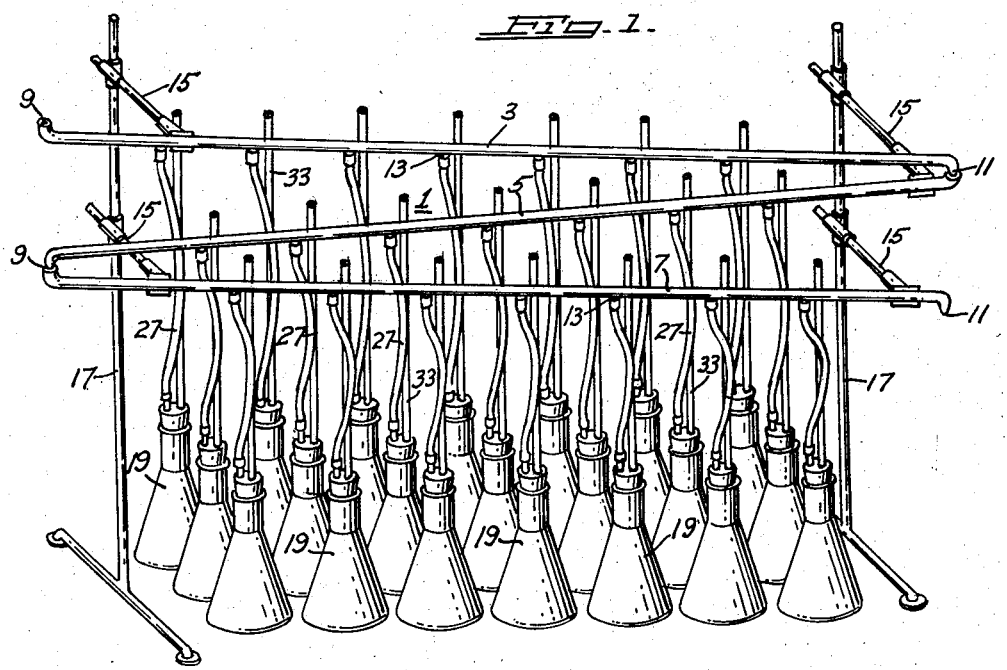
Fig. 1.
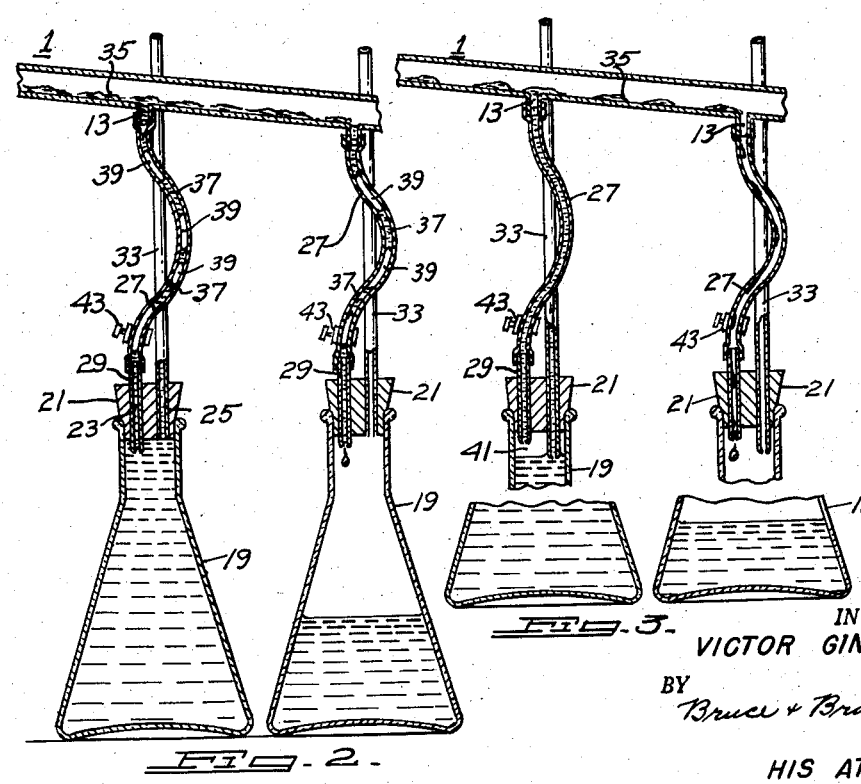
Fig. 2.
Fig. 3.
INVENTOR.
VICTOR GINSBURG
BY
Bruce & Brosler
HIS ATTORNEYS

United States Patent Office 2,884,021
Patented Apr. 28, 1959

2,884,021

APPARATUS FOR THE COLLECTION OF FRACTIONS

Victor Ginsburg, Berkeley, Calif.

Application January 24, 1956, Serial No. 560,974

4 Claims. (Cl. 141—35)

My invention relates broadly to study and analysis of liquids and solutions and more particularly to equipment for the collection of fractions.

Among the objects of my invention are, (1) To provide a novel and improved apparatus for the collection of fractions;

(2) To provide a novel and improved apparatus for automatically collecting fractions;

(3) To provide novel and improved apparatus for collecting fractions, which apparatus entails no moving parts and is entirely automatic;

(4) To provide novel and improved apparatus for collections of fractions, which apparatus is of extremely simple design;

(5) To provide novel and improved apparatus having the capacity for collecting numerous fractions, and within a minimum of space;

(6) To provide novel and improved fraction collecting apparatus which embodies a high degree of flexibility.

Additional objects of my invention will be brought out in the following description of a preferred embodiment of the same taken in conjunction with the accompanying drawings wherein, Figure 1 is a view illustrating one embodiment of the apparatus of the present invention;

Figure 2 is a fragmentary portion of the apparatus of Figure 1, depicting one manner of operating the same;

Figure 3 is a view corresponding to that of Figure 2, but depicting a modified way of utilizing the apparatus of Figure 1.

Referring to the drawings for the specific details of my invention in its preferred form, the same involves a manifold 1 of many sections 3, 5, 7 etc., each section being of tubular material preferably glass, having at one end an inlet opening 9 and a discharge opening at its other end, preferably in the form of a downwardly directed teat 11 adapted to fit within the inlet opening of a similar manifold section. At preferable uniformly spaced points intermediate the ends of each manifold sections, such section is provided with a plurality of depending nipples 13.

A plurality of such sections are adapted to be coupled in series with the discharge teat of one section entering the inlet opening of the succeeding section, and this may be realized by supporting the various sections in suitable clamps 15 carried by supports 17 of the type customarily employed in chemical laboratories or the like.

The construction and arrangement of the manifold sections effectively provides a hinge action between adjacent sections, thus permitting angular adjustment of each section with respect to the others whereby the various sections of the manifold may be arranged zigzag fashion to present the greatest number within the smallest space. The clamps are adjusted as to elevation to provide downgrade flow at a relatively slow rate, from one end of the manifold to the other end through all the sections in series.

Fractions are preferably collected in a plurality of flasks or other containers 19, each having its mouth closed by a cork 21 having a pair of passages 23, 25 therethrough to the interior of the flask. Each flask is connected to one of the nipples by a flexible tube 27 of plastic or the like which is coupled at one end to such nipple and at its other to the flask through the cork of such flask. To facilitate the connection at the flask end, the cork is provided in one of its passages with a short rigid tube section 29 which extends sufficiently above the exposed end of the cork to permit attachment of the lower end of the flexible tube. The two together may be considered to constitute a filling tube.

The lower end of the short rigid tube section 29 terminates adjacent the inner end of the cork and at this end, it is preferably constricted somewhat to assure discharge therefrom in the form of drops, as distinguished from a continuous flow. The extent of such constriction is not critical.

Through the remaining passage in the cork, I insert an exhaust tube 33 of plastic or the like to approximately the lower surface of the cork.

As thus far described, liquid 35 entering the uppermost end of the manifold will fill each flask in succession starting with the one closest to it. In collecting fractions however, it is important that each flask be isolated from the other insofar as any liquid connection between them is concerned. This may be accomplished in either of two ways, depending somewhat on the nature of the flow of liquid in the manifold and upon the nature of the liquid itself.

If the liquid flowing in the manifold possess sufficient surface tension, and if the flow be sufficiently fast to fill the opening through the nipple, the exhaust tube need terminate at its lower end, approximately at the lower end of the cork. Under the foregoing conditions, liquid entering the first nipple and associated filling tube to the flask below, will break up into sections 37 separated by air bubbles 39 and as each section reaches the lower end of the filling tube, it will discharge therefrom in the form of drops, into the flask, until the flask completely fills and the liquid rises in the exhaust tube to a height sufficient to form a column which will balance the weight of the liquid in the filling tube. The bubbles then existing in the filling tube will remain and serve to isolate the contents of that particular flask from liquid in the manifold, and consequently isolate the contents of that flask from the contents of any of the other flasks.

Where the rate of flow is insufficient to fill the opening in the nipple, the drops of liquids entering the nipple and associated filling tube will adhere to the proximate side thereof while traveling downwardly to the constricted end of the filling tube, from which end it will discharge into the flask in the form of drops. Inasmuch as no air will be trapped either in the nipple or the filling tube by such flow, no air bubbles will be formed therein, and upon filling of a flask, the nipple and filling tube will then also fill up completely. A similar result would obtain if the liquid were alcohol or the like having a low surface tension.

In order to obtain isolation of one flask with respect to the others under the conditions thus described, the exhaust tube will be lowered so as to terminate within the flask at some point below the upper end of the chamber provided by such flask. With this adjustment, the flask can only fill to the lower end of the exhaust tube, following which any further supply to the flask will cause a rise of the liquid in the exhaust tube until the column formed in the exhaust tube creates sufficient air pressure within the flask below the cork, to support the column of liquid in the filling tube. The air space 41 thus created within the flask will function to isolate the contents of such flask from the contents of any other flask in the system.

This latter arrangement may also be utilized under conditions of a more rapid flow of the liquid in the manifold, such as would produce air bubbles in the filling tube, in which case, isolation would still be realized by the development of the air space within the flask. The presence of air bubbles in the filling tube may be looked upon as offering added assurance of isolation.

In subsequently removing any container, I prefer to first close off the filling tube at a point just above the short rigid tube section, to permit uncoupling of the flexible portion of the filling tube. Such closing off of the filling tube may be accomplished through the use of screw clamps 43 or the like.

From the foregoing, it becomes apparent that the invention as described fulfills all the objects thereof, and while the same has been illustrated and described in its preferred form and in detail, it is subject to alteration and modification without departing from the underlying principles involved. Accordingly, I do not desire to be limited to the specific details illustrated and described except as may be necessitated by the appended claims.

I claim:

1. Apparatus for the collection of fractions comprising a sectional manifold involving a plurality of sections, each section having an inlet opening at one end, a discharge opening at its other end and a plurality of spaced nipples intermediate said ends, means for supporting said manifold sections in series with the discharge opening of one in flow relationship with the inlet opening of the other and with each section angularly adjustable with respect to its preceding section to permit angular adjustment of each with respect to the others while allowing liquid flow from one to the other.

2. Apparatus for the collection of fractions comprising a sectional manifold involving a plurality of sections, each section having an inlet opening at one end, a discharge teat at its other end and a plurality of spaced nipples intermediate said ends, and means for supporting said manifold sections in series with the discharge teat of one in flow relationship with the inlet opening of the other and with each section angularly adjustable with respect to its preceding section to permit angular adjustment of each with respect to the others while allowing liquid flow from one to the other.

3. Apparatus for the collection of fractions comprising a sectional manifold involving a plurality of sections, each section having an inlet opening at one end, a discharge teat at its other end and a plurality of spaced nipples intermediate said ends, means for supporting said manifold sections in series with the discharge teat of one in flow relationship with the inlet opening of the other and with each section angularly adjustable with respect to its preceding section to permit angular adjustment of each with respect to the others while allowing liquid flow from one to the other, a plurality of containers, a tube connecting one of said nipples to a container, a tube similarly connecting each of said other nipples to an associated container, and an exhaust tube extending upwardly from each of said containers.

4. Apparatus for the collection of fractions comprising a sectional manifold involving a plurality of sections, each section having an inlet opening at one end, a discharge teat at its other end and a plurality of spaced nipples intermediate said ends, means for supporting said manifold sections in series with the discharge teat of one in the inlet opening of the other and with each section angularly adjustable with respect to its preceding section to permit angular adjustment of each with respect to the others while allowing liquid flow from one to the other, a plurality of flask containers, a cork in the entrance to each flask container and having a pair of passages into said container, a flexible tube connecting one of said nipples to a flask container through its associated cork, a flexible tube similarly connecting each of said other nipples to an associated flask container, and an exhaust tube extending upwardly from each of said flask containers through the associated corks, said exhaust tubes starting from a point below the upper end of the chamber in their associated containers.

References Cited in the file of this patent

UNITED STATES PATENTS

| | | |
|---|---|---|
| 699,917 | Gruenebaum | May 13, 1902 |
| 704,292 | Beebe | July 8, 1902 |
| 1,325,991 | Kine | Dec. 23, 1919 |
| 2,006,393 | Hopgood | July 2, 1935 |
| 2,645,907 | Droste et al. | July 21, 1953 |